United States Patent Office 3,104,199
Patented Sept. 17, 1963

3,104,199
METHOD FOR DESTROYING NEMATODES
William K. Langdon, Grosse Ile, and William W. Levis, Jr., Wyandotte, Mich., assignors to Wyandotte Chemicals Corporation, Wyandotte, Mich., a corporation of Michigan
No Drawing. Filed June 3, 1960, Ser. No. 33,636
21 Claims. (Cl. 167—22)

This invention relates to a method for destroying nematodes. The method of the invention is concerned particularly with a new method of agriculture for improving the plant growing properties of soil by controlling and destroying harmful and unwanted nematode parasites present in soil.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and to possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

We have found that a class of compounds, which are 2-aminoalkanenitriles having at least 3 carbon atoms, are effective nematocides. The nematocidal agents are represented by the general formula

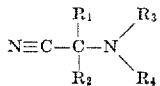

wherein either one or both of $R_1$ and $R_2$ is alkyl or $R_1$ and $R_2$, collectively with the α-carbon atom of the acetonitrile group, form 5-, 6- or 7-membered cycloalkyl groups. We have found by tests subsequently described that amine derivatives of acetonitrile wherein both $R_1$ and $R_2$ are hydrogen, i.e., aminoethanenitriles, are either completely ineffective as nematocides, or only slightly so, whereas amine derivatives wherein either or both of $R_1$ and $R_2$ are alkyl radicals or cycloalkyl groups, such as 2-aminopropanenitriles, are surprisingly effective at commercially practicable concentrations. For example, we have found that α,α,α′,α′-2-pentamethyl-1,4-piperazinediacetonitrile is a remarkably effective nematocide. In general, the nematocidal agents of the invention can be prepared by reacting an aldehyde cyanohydrin or a ketone cyanohydrin with an amine.

The nematocidal agents are, in general, alkyl-substituted - 2 - aminoalkanenitriles, nitrogen-substituted-poly (cyanoalkyl)alkylene polyamines, 2-(alkoxyalkylamino) alkanenitriles, α-substituted-piperazinealkanenitriles, α-substituted-morpholinealkanenitriles and di(N-cyanoalkylaminoalkyl) ethers of polyoxyalkylene glycols having an average molecular weight of about 200 to 1000.

The species of this class of nematocidal agents are defined by the general formula

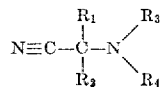

The substituents for $R_1$ and $R_2$ are defined in two groups for purposes of clarity. Group A substituents for $R_1$ and $R_2$ consist of hydrogen or alkyl radicals having up to 4, inclusive, carbon atoms, at least one of $R_1$ and $R_2$ being alkyl. On the other hand, $R_1$ and $R_2$ can constitute, collectively, tetramethylene, pentamethylene or hexamethylene radicals which constitute the Group B substituents for $R_1$ and $R_2$. In the latter case, $R_1$ and $R_2$ form together with the 2- or α-carbon atom of the alkanenitrile group a cycloalkyl ring, i.e. cyclopentyl, cyclohexyl or cycloheptyl ring.

$R_3$ and $R_4$ each can be substituted by members selected from one of two groups, also, because, just as is true of $R_1$ and $R_2$, $R_3$ and $R_4$ can constitute, collectively, cyclic rings.

Thus, Group C substituents for $R_3$ consist of hydrogen, alkyl radicals having up to 4, inclusive, carbon atoms and radicals represented by the formulae (I) $-\underset{R_2}{\underset{|}{C}}-C\equiv N$ (II) $-[C_aH_{2a}-N]_b-R_5$ (III) $-[C_aH_{2a}-O]_b-[C_aH_{2a}-O]_c-C_dH_{2d+1}$ and

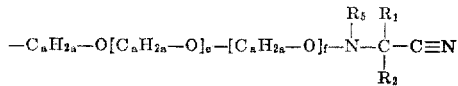

(IV)

$R_1$ and $R_2$ have the same meaning in these formulae as given above, of course. $R_5$ is a member of the group consisting of hydrogen, alkyl and hydroxyalkyl radicals having up to 4, inclusive, carbon atoms and the radical represented by Formula I, above. In each of Formulae II, III and IV, $a$ is an integer in the range of 2 to 4, inclusive, and $b$ is an integer in the range of 1 to 4, inclusive. In Formula III, $c$ can be 0 to 4, inclusive, and $d$ can be 1 to 4, inclusive. In Formula IV, $e$ can be 1 to 50, inclusive, and $f$ can be 0 to 50, inclusive.

Before explaining the second group of substituents, Group D, for $R_3$ in which $R_3$ and $R_4$ collectively, together with the N atom to which $R_3$ and $R_4$ are attached, constitute piperazine or morpholine rings, the substituents for $R_4$ will be defined.

$R_4$ can be substituted by members of the group, Group E, consisting of alkyl radicals having up to 4, inclusive, carbon atoms and the radical represented by Formula I, above.

$R_3$ and $R_4$ can, alternatively, be substituted by members of the group, Group D, consisting of radicals represented by the formulae (V) 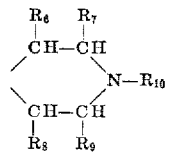

and (VI) 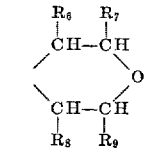

in which $R_6$, $R_7$, $R_8$ and $R_9$ are hydrogen or alkyl radicals having 1 to 4, inclusive, carbon atoms and $R_{10}$ is hydrogen, alkyl or hydroxyalkyl radical having up to 4, inclusive, carbon atoms. $R_{10}$ can also be the radical represented by Formula I, hereinabove.

Thus, the simplest members of the class of nematocidal agents are the alkyl-substituted-2-aminoalkanenitriles. Examples of these compounds include α - methyl - α - (methylamino)-propanenitrile, which could be termed, also, α - (methylamino) - 2 - methylpropanenitrile and which has the formula

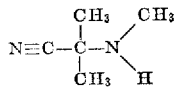

α-methyl-α-(methylamino)propanenitrile can be prepared by reacting acetone cyanohydrin with methylamine. Other examples of this subgroup are α-ethyl-α-(dipropylamino)butanenitrile, α - (ethylamino)propanenitrile, α - (diethylamino)propanenitrile, α - [(N - propyl)butylamino] - α - propylhexanenitrile, α - diethylaminocyclohexanenitrile, N - (1 - cyanocyclopentyl) - N - (2 - cyano - 2 - propyl) - N' - (1 - cyanoethyl)ethylenediamine, N,N - dimethyl - (1 - cyano) - cycloheptylamine, α,α' - iminobis(2 - methylpropanenitrile), α,α' - iminobispropanenitrile), N - ethyl - α,α' - iminobis(butanenitrile), and the like.

Another subgroup of nematocidal agents is the group of nitrogen - substituted - poly(cyanoalkyl)alkylene polyamines. An example of this subgroup is N,N'-di(1-cyanoethyl)ethylenediamine which has the structure,

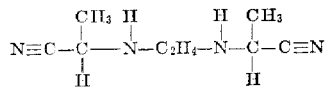

N,N'-di-(1-cyanoethyl)ethylenediamine can be prepared by reacting lactonitrile with ethylenediamine. Other examples of this subgroup are N,N,N'-tri(1-cyanoethyl)ethylenediamine,
N,N,N',N'-tetra(1-cyanoethyl)ethylenediamine,
N,N'-di(2-cyano-2-propyl)ethylenediamine,
N,N,N'-tri(2-cyano-2-propyl)ethylenediamine,
N,N,N',N'-tetra(2-cyano-2-propyl)ethylenediamine,
N-(2-cyano-2-propyl)-N'-(5-cyano-5-nonyl)ethylenediamine,
N-(2-cyano-2-propyl)-N'-butylethylenediamine,
N-(1-cyanoethyl)-N''-(2-cyano-2-propyl)diethylenetriamine,
N-butyl-N-(2-cyano-2-propyl)-N'''-(3-cyano-3-pentyl)tripropylenetetramine,
N-ethyl-N,N''''-di-(5-cyano-5-nonyl)tetrabutylenepentamine,
N-(2-cyano-2-propyl)-N'-(hydroxybutyl)ethylenediamine,
N-(2-cyano-2-propyl)-N-methyl-N'''-(hydroxyethyl)tripropylenetetramine ,
N-(1-cyanoethyl)-N-(1-cyanocyclopentyl)-N''''-(hydroxybutyl)tetraethylenepentamine,
N-(1-cyanocycloheptyl)-N-(1-cyanocyclohexyl)-N''''-(1-cyanocyclopentyl)tetrabutylenepentamine, and the like.

Another subgroup of the nematocidal agents is the group of N-substituted-(cyanoalkyl)alkoxyalkylamines. An example of this subgroup is N-(1-cyanoethyl)-ethoxyethylamine having the structure,

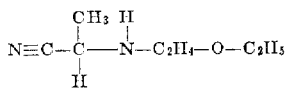

N-(1-cyanoethyl)-ethoxyethylamine can be prepared by reacting lactonitrile with ethoxyethylamine and the latter can be prepared by reacting ammonia with ethyl ether of ethylene glycol by the process of U.S. 2,928,877. Other examples of this subgroup are N-(1-cyanoethyl)-methoxypropylamine,
N-(1-cyanoethyl)-methoxyethoxyethylamine,
N-(1-cyanoethyl)-methoxyisopropylamine,
N-(1-cyanoethyl)-methoxyisopropoxypropylamine,
N-(1-cyanoethyl)-methoxyisopropoxyisopropylamine,
2-ethyl-2-(N-propyl-N-propoxyethoxyethoxyethyl-amino)butanenitrile,
2-butyl-2-(N-ethylbutoxybutoxybutoxybutyl-amino)hexanenitrile,
2-(N-methoxyethoxyethoxypropylamino)propanenitrile,
2-ethyl-2-(N-butyl-N-propoxybutoxybutoxybutoxyethoxyethylamino)butanenitrile,
N-(4-cyano-4-heptyl)-N-(2-cyano-2-propyl)butoxyethoxyisopropoxyisopropoxyisopropylamine,
N-butyl-N-(1-cyanocyclohexyl)methoxyisopropoxypropylamine, and the like.

Another subgroup of the nematocidal agents is the group of α-substituted-piperazinealkanenitriles. An example of this subgroup is α,α,α',α'-2-pentamethyl-1,4-piperazinediacetonitrile having the structure,

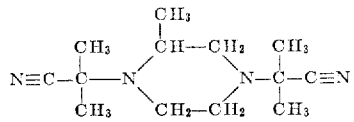

α,α,α',α' - 2 - pentamethyl - 1,4 - piperazinediacetonitrile can be prepared by reacting acetone cyanohydrin with 2-methylpiperazine. Other examples of this subgroup are α,α' - dimethyl - 1,4 - piperazinediacetonitrile, α,α' - trans - 2,5 - tetramethyl - 1,4 - piperazinediacetonitrile, 4 - (2 - hydroxyethyl) - α,2 - dimethyl - 1 - piperazinediacetonitrile, α,α',2 - trimethyl - 1,4 - piperazinediacetonitrile, α,α' - cis - 2,5 - tetramethyl - 1,4 - piperazinediacetonitrile, α,α',2,6 - tetramethyl - 1,4 - piperazinediacetonitrile, α,α,α',α',2,3,5,6 - octaethyl - 1,4 - piperazinediacetonitrile, α,3 - dibutyl - 5 - ethyl - α',6 - dimethyl - α,2 - dipropyl - 1,4 - piperazinediacetonitrile, α,α' - dibutyl - 1,4 - piperazinediacetonitrile, and the like.

Another subgroup of the nematocidal agents is the group of α-substituted-morpholinealkanenitriles. An example of this subgroup is α-methyl-4-morpholineacetonitrile having the structure,

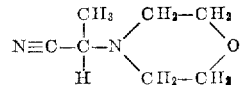

α-methyl-4-morpholineacetonitrile can be prepared by reacting lactonitrile with morpholine. Other examples of this subgroup are α,α - dimethyl - 4 - morpholineacetonitrile, α,3,5 - trimethyl - 4 - morpholineacetonitrile, α,α,2-tributyl - 6 - ethyl - 5 - methyl - 4 - morpholineacetonitrile, α,α - diethyl - 2,3,5,6 - tetrapropyl - 4 - morpholineacetonitrile, and the like.

Another subgroup of the nematocidal agents is the group of α-substituted acetonitrile derivatives of di-(2- or 3-aminoalkyl) ethers of polyoxyalkylene polyols. An example of this subgroup is di-[N-(1-cyanoethyl)-3-aminopropyl] ether of polyoxypropylene glycol having an average molecular weight of 400 and having the structure,

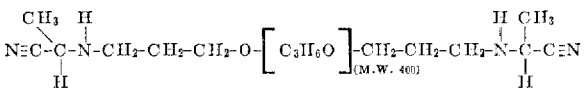

Di-[N-(1-cyanoethyl)-3-aminopropyl] ether of polyoxypropylene glycol having an average molecular weight of 400 can be prepared by reacting the polyoxypropylene glycol with acrylonitrile in the presence of a basic catalyst to produce a di-(cyanoethyl)ether of the polyoxypropylene glycol, catalytically hydrogenating the latter to produce a di-(3-aminopropyl)ether of the polyoxypropylene glycol and reacting the latter with lactonitrile to give the nematocidal agent. In this subgroup the polyoxyalkylene polyols from which the nematocidal agents are prepared are polymers of alkylene oxides, such as ethylene oxide, propylene oxide, butylene oxide, and the like. Copolymers of two or more of such alkylene oxides can be used wherein the different oxides are arranged in blocks of each oxide or randomly mixed along the oxyalkylene chain. The average molecular weight of the polyoxyalkylene polyol from which the nematocidal agents are derived is in the range of 300 to 2000. Examples of other members of this subgroup are bis - [N - (1 - cyano - 1 - ethyl) - 2 - aminoethyl] ether of polyoxyethylene glycol having an average molecular weight of 880, bis-[N-(4-cyano-2,6-dimethyl-4-heptyl) - 3 - aminopropyl] ether of polyoxypropylene glycol having an average molecular weight of 2000, bis-[N-(2-cyano-2-propyl)-3-aminopropyl] ether of polyoxybutylene glycol having an average molecular weight of 900, bis - [N - (1 - cyano - 1 - pentyl) - 3 - aminopropyl] ether of a polyoxyalkylene glycol of about 2000 average molecular weight, prepared by reacting propylene oxide and ethylene oxide sequentially with propylene glycol, that contains a centrally located polyoxypropylene block of about 1750 average molecular weight and two terminally located polyoxyethylene blocks of about -130 average molecular weight, and bis-[N-(1-cyano-1-ethyl)-3-aminoethyl] ether of a polyoxyalkylene glycol having an average molecular weight of about 1200 obtained by reacting an equimolar mixture of ethylene oxide and propylene oxide with ethylene glycol to give a polyoxyalkylene glycol having a random arrangement of oxyethylene and oxypropylene groups. This class of nematocidal agents of the invention can be prepared from any polyoxyalkylene glycol that is a simple polymer of the alkylene oxides indicated or is a polymer containing repeating blocks of different oxyalkylene groups, such as are disclosed in U.S. 2,674,619, or is a polymer of a mixture of different oxyalkylene groups randomly distributed, such as are disclosed in U.S. 2,425,845.

Compounds of this invention may be employed in a variety of compositions for use in nematocides. The nature of these compositions will depend, to a large degree, upon the particular application contemplated. Hence, they may be utilized in any conventional manner, as in soil application by spraying, drenching, or dusting. In addition, in many instances it is advantageous to introduce composition of the invention directly into the soil by hand or mechanical subsoil injectors. Generally, superior results are obtained in subsoil applications when the novel compositions of this invention are introduced into the soil to a depth of 6" or less. The term "soil," as used herein, is intended to include any substance or medium capable of supporting the growth of plants. It is therefore intended to include, in addition to soil, humus, manure, compost, sand, and artificially-created plant growth media, including solutions and/or other hydroponic media.

Compositions of this invention may also be embodied in dusting compounds containing carriers or fillers, such as talc, sand, dry soil, celite, kaolin, fuller's earth, kieselguhr, diatomaceous earth, chalk, gypsum, pyrophyllite, or other inorganic or organic materials, including active ingredients, such as fertilizers, insecticides, fungicides, and/or herbicides. Similarly, if a liquid drench or spray material is desired, a composition of the invention may be formulated as a liquid using as a carrier material various solvents, diluents, extenders, and the like, such as water, aromatic and aliphatic organic liquids, such as acetone, benzene, and/or various alcohols, ethers, ketones, amides, and the like, as well as various petroleum fractions.

Liquid compositions may also contain minor quantities of one or more wetting agents, such as Igepal CO–880 (alkyl phenoxypolyoxyethylene ethanol), Arquad 2-C (quaternary ammonium compound of the formula RR'—N—$(CH_3)_2Cl$), Emulphor ON–870 (polyoxyethylated fatty alcohol), Tween 80 (polyoxyethylene sorbitan monooleate), Triton X–155 (alkyl aryl polyether alcohol), Trem 615 (polyhydric alcohol ester), Tween 85 (polyoxyethylene sorbitan trioleate), Nonic 218 (polyethylene glycol tert-dodecyl thioether), Santomerse D (decyl benzene sodium sulfonate), Pluronic F–68 (condensate of ethylene oxide with an hydrophobic base formed by condensing propylene oxide with propylene glycol), Antarox A–400 (alkyl phenoxypolyoxyethylene ethanol), Triton X–120 (alkyl aryl polyether alcohol), Nacconol NRSF (alkyl aryl sulfonate), Aerosol OS (isopropyl naphthylene sodium sulfonate), Span 40 (sorbitan monopalmitate), Triton B–1956 (modified phthalic glycerol alkyd resin), and Antarox B–290 (polyoxyethylated vegetable oil).

In testing the nematocidal activity of the compounds, the compounds were prepared, first, as wettable powders containing 50 weight percent of the active compound. The wettable powder composition consisted about 4 weight percent Pluronic L61 nonionic surfactant (polyoxyethylene condensate with polyoxypropylene glycol), 4 weight percent Marasperse N anionic surfactant (sodium lignosulfonate) and the remainder Hi-Sil 101 synthetic silica pigment. The wettable powder concentrate containing the test compound was dispersed in 10 milliliters of distilled water for the test.

The tests were carried out using Panagrellus, a saprozoic nematode. The nematodes were recovered from culture media by standard procedures and 50–75 nematodes were placed in stoppered test tubes containing aqueous dispersions of the wettable powder concentrate of the nematocide compound at the active compound dosages indicated in Table I where the test results are tabulated. Microscopic observations of the nematodes were made over a period of 5–7 days. The constant and active movement of the live nematodes permits an accurate measurement of the mortality rate and, thereby, gives the measure of the activity of the compound under test.

*Table I*

| Ex. No. | Nematocidal agent | Active agent conc., p.p.m. | Percent kill—After days | | | | | |
|---|---|---|---|---|---|---|---|---|
| | | | 1 | 2 | 3 | 4 | 5 | 6 |
| 1 | α,α'-Dimethyl-1,4-piperazinediacetonitrile (as 25% wettable powder). | 1,000 | 100 | 100 | | 100 | 100 | |
| | | 333 | 99 | 100 | | 100 | 100 | |
| | | 111 | 100 | 99 | | 100 | 100 | |
| | | 37 | 30 | 50 | | 85 | 100 | |
| | | | 0.5 | 1.5 | 2.5 | 3.5 | 4.5 | 6.5 |
| 2 | α,α'-Trans-2,5-tetramethyl-1,4-piperazinediacetonitrile. | 1,000 | 100 | 100 | 100 | 100 | 100 | 100 |
| | | 333 | 100 | 100 | 100 | 100 | 100 | 100 |
| | | 111 | 90 | 100 | 100 | 100 | 100 | 100 |
| | | 37 | 65 | 97 | 98 | 100 | 96 | 98 |
| 3 | 4-(2-hydroxyethyl)-α-2-dimethyl-1-piperazineacetonitrile. | 1,000 | 100 | 100 | 100 | 100 | 100 | 100 |
| | | 333 | 98 | 100 | 100 | 100 | 100 | 100 |
| | | 111 | 95 | 100 | 100 | 100 | 100 | 100 |
| | | 37 | 0 | 0 | 0 | 0 | 0 | 0 |
| 4 | α,α'-2-trimethyl-1,4-piperazinediacetonitrile. | 1,000 | 100 | 100 | 100 | 100 | 100 | 100 |
| | | 333 | 100 | 100 | 100 | 100 | 100 | 100 |
| | | 111 | 100 | 100 | 100 | 100 | 100 | 100 |
| | | 37 | 50 | 85 | 80 | 92 | 98 | 100 |
| | | | 0.5 | 2 | 3 | 4 | 5 | 6 |
| 5 | α,α,α',α'-2-pentamethyl-1,4-piperazinediacetonitrile. | 9,000 | 100 | | | | 100 | |
| | | 900 | 100 | | | | 100 | |
| | | 90 | 100 | | | | 100 | |
| 6 | α,α-Cis-2,5-tetramethyl-1,4-piperazinediacetonitrile. | 9,000 | 100 | 100 | | | 100 | |
| | | 900 | 90 | 100 | | | 100 | |
| | | 90 | 0 | 100 | | | 100 | |
| 7 | α,α'-2,6-tetramethyl-1,4-piperazinediacetonitrile. | 9,000 | 100 | 100 | 100 | 100 | 100 | |
| | | 900 | 95 | 100 | 100 | 100 | 100 | |
| | | 90 | 5 | 95 | 95 | 98 | 98 | |

Table I—Continued

| Ex. No. | Nematocidal agent | Active agent conc., p.p.m. | Percent kill—After days | | | | | |
|---|---|---|---|---|---|---|---|---|
| | | | 1 | 2 | 3 | 4 | 5 | 6 |
| 8 | N-(α-methylaceto-nitrile)morpholine. | 9,000<br>900<br>90 | 100<br>85<br>25 | 100<br>100<br>90 | 100<br>100<br>100 | | 100<br>100<br>100 | |
| | | | 1 | 2 | 3 | 4 | 5 | 6 |
| 9 | α,α-Dimethyl-4-mor-pholineacetonitrile. | 5,000<br>500<br>50<br>5 | | 100<br>100<br>100<br>0 | 100<br>100<br>100<br>0 | 100<br>100<br>100<br>0 | | 100<br>100<br>100<br>0 |
| 10 | N-(α-methylaceto-nitrile)-3,5-dimethyl-morpholine. | 5,000<br>500<br>50 | 100<br>100<br>50 | 100<br>100<br>50 | | 100<br>100<br>100 | 100<br>100<br>100 | 100<br>100<br>100 |
| | | | 0.5 | 1 | 2 | 3 | 4 | 5 |
| 11 | Ethylamino-α-methyl-acetonitrile. | 9,000<br>900<br>90 | 100<br>100<br>100 | | | | | 100<br>100<br>100 |
| 12 | Diethylamino-α-meth-ylacetonitrile. | 9,000<br>900<br>90 | 100<br>95<br>50 | | 100<br>100<br>50 | 100<br>100<br>70 | 100<br>100<br>90 | 100<br>100<br>97 |
| 13 | N,N-di(α-methylace-tonitrile)-ethylenedi-amine. | 9,000<br>900<br>90 | 100<br>100<br>75 | | 100<br>100<br>95 | 100<br>100<br>100 | | 100<br>100<br>100 |
| 14 | Ethoxyethylamino-α-methylacetonitrile. | 9,000<br>900<br>90 | 100<br>95<br>80 | | 100<br>100<br>95 | 100<br>100<br>97 | 100<br>100<br>100 | 100<br>100<br>100 |
| | | | 1 | 2 | 3 | 4 | 5 | 6 |
| 15 | Methoxy-n-propyl-amino-α-methyl-acetonitrile. | 5,000<br>500<br>50 | 100<br>100<br>50 | 100<br>100<br>50 | | 100<br>100<br>100 | | 100<br>100<br>100 |
| 16 | Methoxyisopropyl-amino-α-methylace-tonitrile. | 5,000<br>500<br>50 | 100<br>100<br>0 | 100<br>100<br>0 | | 100<br>95 | | 100<br>100<br>100 |
| 17 | 2-(methoxyethoxy-ethylamino)propane-nitrile. | 5,000<br>500<br>50 | 100<br>100<br>75 | 100<br>100<br>75 | | 100<br>100<br>97 | | 100<br>100<br>100 |
| 18 | Methoxyisopropoxy-n-propylamino-α-methylacetonitrile. | 5,000<br>500<br>50 | 100<br>0<br>0 | 100<br>0<br>0 | | 100<br>50<br>25 | | 100<br>95<br>55 |
| 19 | Methoxyisopropoxy-isopropylamino-α-methylacetonitrile. | 5,000<br>500<br>50 | 100<br>100<br>0 | 100<br>100<br>0 | | 100<br>100<br>80 | | 100<br>100<br>97 |
| 20 | Di-[N-(1-cyanoethyl)-3-aminopropyl] ether of polyoxypropylene glycol of average molecular weight of 400. | 5,000<br>500<br>50 | 100<br>98<br>0 | | 100<br>100<br>0 | 100<br>100<br>0 | | |
| 21 | Ethoxyethylamino-bis-(α,α'-methylaceto-nitrile). | 5,000<br>500<br>50 | 100<br>100<br>0 | | 100<br>100<br>25 | 100<br>100<br>30 | | |
| 22 | Oxy-bis-(ethoxypropyl-amino)-α-methylace-tonitrile. | 5,000<br>500<br>50 | 100<br>100<br>0 | | 100<br>100<br>12 | 100<br>100<br>10 | | |

Additional tests were carried out with the nematocidal compounds of the invention using tomato plants in soil which was infected with root knot nematodes. The procedure that was used consisted in formulating the nematocidal agent as a 25% wettable powder in the manner described for the tests reported in Table I. Potting soil was prepared by inoculating it with soil which was heavily infested with root knot nematodes and with diced root knot galls. The soil was allowed to cure for two weeks before being used in the tests. Tomato transplants were then placed in the pots of the infested soil and the soil was treated with the nematocidal agent-containing composition in the concentrations indicated in Table II, below. After about six weeks, the tomato plants were removed from the soil, adhering soil was washed off from the tomato plant roots and the amount of infection was determined by inspection. The reseults of these tests are summarized in Table II, below.

Table II

| Ex. No. | Nematocidal agent | Dosage, lbs./acre | Number of plants harvested | Percent control | Remarks |
|---|---|---|---|---|---|
| 23 | α,α'-Dimethyl-1,4-piper-azinediacetonitrile. | 400<br>200 | | 100<br>0 | |
| 24 | N-(α-methylacetonitrile) morpholine. | 400<br>100 | 14<br>10 | 100<br>93 | Excellent plants.<br>Do. |
| 25 | α,α,α',α'-2-pentamethyl-1,4-piperazinediacetoni-trile. | 400<br>200<br>100 | 15<br>15<br>9 | 100<br>100<br>93 | Do.<br>Do.<br>Do. |

In using the 2-aminoalkanenitriles as nematocides, the active compounds, diluted or undiluted, can be applied to the soil at rates of 25 to 500 pounds per acre. The preferred application for treating soils of average nematode infestation is from 50 to 300 pounds per acre.

We claim:

1. The method of agriculture which comprises applying to agricultural soil at a concentration toxic to nematodes an active nematocidal agent having the formula

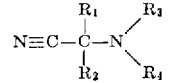

wherein $R_1$ and $R_2$ are members selected from the group consisting of hydrogen, alkyl radicals having 1 to 4, inclusive, carbon atoms, $R_1$ and $R_2$ collectively constituting a tetramethylene radical, $R_1$ and $R_2$ collectively constituting a pentamethylene radical, and $R_1$ and $R_2$ collectively constituting a hexamethylene radical; said tetramethylene, pentamethylene and hexamethylene radicals forming a cycloalkyl ring with the α-carbon atom of the acetonitrile group in said formula and at least one of $R_1$ and $R_2$ being other than hydrogen, wherein $R_3$ and $R_4$ are members selected from the group consisting of hydrogen and radicals represented by the formulae below, at least one of $R_3$ and $R_4$ being other than hydrogen, (I)

(II)

(III)

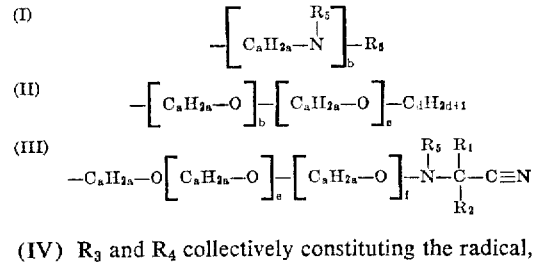

(IV) $R_3$ and $R_4$ collectively constituting the radical,

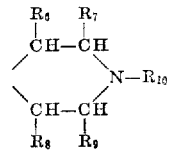

and, (V) $R_3$ and $R_4$ collectively constituting the radical,

wherein $R_1$ and $R_2$ having the meaning ascribed to them hereinabove, $a$ is 2 to 4, inclusive, $b$ is 1 to 4, inclusive, $c$ is 0 to 4, inclusive, $d$ is 1 to 4, inclusive, $e$ is 1 to 50, inclusive, $f$ is 0 to 50, inclusive, wherein $R_5$ is a member selected from the group consisting of hydrogen, alkyl and hydroxyalkyl radicals having 1 to 4, inclusive, carbon atoms and the radical represented by formula

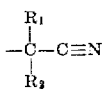

wherein $R_1$ and $R_2$ are defined as above; wherein $R_6$, $R_7$, $R_8$ and $R_9$ are members selected from the group consisting of hydrogen and alkyl radicals having 1 to 4, inclusive, carbon atoms; and wherein $R_{10}$ has the significance ascribed to $R_5$ hereinabove.

2. A method according to claim 1 wherein said active nematocidal agent is α,α'-dimethyl-1,4-piperazinediacetonitrile.

3. A method according to claim 1 wherein said active nematocidal agent is α,α'-trans-2,5-tetramethyl-1,4-piperazine-diacetonitrile.

4. A method according to claim 1 wherein said active nematocidal agent is 4-(2-hydroxyethyl)-α-2-dimethyl-1-piperazineacetonitrile.

5. A method according to claim 1 wherein said active nematocidal agent is α,α',2-trimethyl-1,4-piperazinediacetonitrile.

6. A method according to claim 1 wherein said active nematocidal agent is α,α,α',α',2-pentamethyl-1,4-piperazinediacetonitrile.

7. A method according to claim 1 wherein said active nematocidal agent is α,α-cis-2,5-tetramethyl-1,4-piperazinediacetonitrile.

8. A method according to claim 1 wherein said active nematocidal agent is α,α',2,6-tetramethyl-1,4-piperazinediacetonitrile.

9. A method according to claim 1 wherein said active nematocidal agent is N-(α-methylacetonitrile)morpholine.

10. A method according to claim 1 wherein said active nematocidal agent is α,α-dimethyl-4-morpholineacetonitrile.

11. A method according to claim 1 wherein said active nematocidal agent is N-(α-methylacetonitrile)-3,5-dimethylmorpholine.

12. A method according to claim 1 wherein said active nematocidal agent is N,N'-di(α-methylacetonitrile)ethylenediamine.

13. A method according to claim 1 wherein said active nematocidal agent is ethoxyethylamino-α-methylacetonitrile.

14. A method according to claim 1 wherein said active nematocidal agent is methoxy-n-propylamino-α-methylacetonitrile.

15. A method according to claim 1 wherein said active nematocidal agent is methoxyisopropylamino-α-methylacetonitrile.

16. A method according to claim 1 wherein said active nematocidal agent is methoxyisopropoxy-n-propylamino-α-methylacetonitrile.

17. A method according to claim 1 wherein said active nematocidal agent is methoxyisopropoxyisopropylamino-α-methylacetonitrile.

18. A method according to claim 1 wherein said active nematocidal agent is di-[N-(1-cyanoethyl)-3-aminopropyl] ether of polyoxypropylene glycol having an average molecular weight of 400.

19. A method according to claim 1 wherein said active nematocidal agent is ethoxyethylamino-bis-(α,α'-methylacetonitrile).

20. A method according to claim 1 wherein said active nematocidal agent is oxy-bis-(ethoxypropylamino)-α-methylacetonitrile.

21. A method according to claim 1 wherein said active nematocidal agent is 2-(methoxyethoxyethylamino)propanenitrile.

References Cited in the file of this patent
UNITED STATES PATENTS

| | | |
|---|---|---|
| 2,268,108 | Collie et al. | Dec. 30, 1941 |
| 2,419,073 | Hammer | Apr. 15, 1947 |
| 2,473,984 | Bickerton | June 21, 1949 |
| 2,502,244 | Carter | Mar. 28, 1950 |
| 2,543,580 | Kay | Feb. 27, 1951 |
| 2,779,680 | Wolf | Jan. 29, 1957 |
| 2,802,021 | Heininger | Aug. 6, 1957 |
| 2,819,197 | Santmyer et al. | Jan. 7, 1958 |

OTHER REFERENCES

De Ong: Chemistry and Uses of Insecticides, published by Reinhold Publishing Corp., New York, 1948, pages 2, 3, 176, and 177.

UNITED STATES PATENT OFFICE
CERTIFICATE OF CORRECTION

Patent No. 3,104,199 September 17, 1963

William K. Langdon et al.

It is hereby certified that error appears in the above numbered patent requiring correction and that the said Letters Patent should read as corrected below.

Column 5, line 28, for "aminoethyl" read -- aminopropyl --; columns 6 and 7, Table I, in the heading to the third column thereof, for "comc.", each occurrence, read -- conc. --; same column 7, line 74, for "reseults" read -- results --.

Signed and sealed this 26th day of May 1964.

(SEAL)
Attest:

ERNEST W. SWIDER
Attesting Officer

EDWARD J. BRENNER
Commissioner of Patents